(12) United States Patent
Berchanskiy et al.

(10) Patent No.: US 11,347,673 B2
(45) Date of Patent: May 31, 2022

(54) METHOD, APPARATUS, SYSTEM FOR THUNDERBOLT-BASED DISPLAY TOPOLOGY FOR DUAL GRAPHICS SYSTEMS

(71) Applicant: Intel Corporation, Santa Clara, CA (US)

(72) Inventors: Dmitriy Berchanskiy, Roseville, CA (US); Venkataramani Gopalakrishnan, Folsom, CA (US); Jose A. Meza Arellano, Diamond Springs, CA (US); James E. Akiyama, Tigard, OR (US); Kevin Southern, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1094 days.

(21) Appl. No.: 15/721,831

(22) Filed: Sep. 30, 2017

(65) Prior Publication Data

US 2019/0102334 A1     Apr. 4, 2019

(51) Int. Cl.
| | |
|---|---|
| *G06F 13/40* | (2006.01) |
| *G06F 13/38* | (2006.01) |
| *G06F 3/14* | (2006.01) |
| *G06F 13/42* | (2006.01) |
| *G06T 1/20* | (2006.01) |

(52) U.S. Cl.
CPC ............. *G06F 13/4027* (2013.01); *G06F 3/14* (2013.01); *G06F 13/385* (2013.01); *G06F 13/4282* (2013.01); *G06T 1/20* (2013.01)

(58) Field of Classification Search
CPC ............... G06F 13/4027; G06F 13/385; G06F 13/4282; G06F 3/14; G06T 1/20
See application file for complete search history.

(56) References Cited

U.S. PATENT DOCUMENTS

| | | | |
|---|---|---|---|
| 6,262,594 B1 * | 7/2001 | Cheung ............... | G06F 15/7867 326/38 |
| 7,307,667 B1 * | 12/2007 | Yeh ......................... | H04N 5/76 348/555 |
| 10,712,793 B2 * | 7/2020 | Huang .................... | G06F 1/263 |

(Continued)

OTHER PUBLICATIONS

German Patent Office; First Office Action issued in German Patent Application No. 102018006852.9; dated May 16, 2019; 9 pages including English translation.

*Primary Examiner* — Henry Tsai
*Assistant Examiner* — Aurangzeb Hassan
(74) *Attorney, Agent, or Firm* — Alliance IP, LLC

(57) ABSTRACT

Aspects of the embodiments are directed to a ThunderBolt (TBT) input/output (I/O) controller apparatus. The TBT I/O controller apparatus can include an output port to receive a connection to a display device; a multiplexer coupled to the output port; a first input port coupled to the multiplexer; a second input port coupled to the multiplexer; a memory element to store graphics preference data; and TBT firmware (FW). The TBT FW can detect a connected device at the input port; determine a graphics processor for the connected device based on the graphics preference data; and logically connect the connected device to one of the first input port or the second input port through the multiplexer based on the determined graphics processor.

25 Claims, 15 Drawing Sheets

(56) References Cited

U.S. PATENT DOCUMENTS

| | | | |
|---|---|---|---|
| 2005/0253828 A1* | 11/2005 | Jeong | G06F 1/3215 345/204 |
| 2006/0282604 A1* | 12/2006 | Temkine | G09G 5/363 710/314 |
| 2007/0239913 A1* | 10/2007 | Knepper | G06F 3/1415 710/104 |
| 2009/0066705 A1* | 3/2009 | Casparian | G09G 5/006 345/503 |
| 2010/0149194 A1* | 6/2010 | Yu | G06F 8/41 345/505 |
| 2010/0332799 A1* | 12/2010 | Sonobe | G06F 1/206 712/43 |
| 2013/0290594 A1* | 10/2013 | Callahan | G01R 31/317 710/313 |
| 2015/0348514 A1* | 12/2015 | Priel | G09G 5/377 345/547 |
| 2015/0378920 A1* | 12/2015 | Gierach | G06T 1/20 711/118 |
| 2016/0117793 A1 | 4/2016 | Sierra et al. | |
| 2017/0017595 A1 | 1/2017 | Schnell | |
| 2017/0242804 A1 | 8/2017 | Voor et al. | |
| 2018/0082431 A1* | 3/2018 | Andersson | G06T 1/20 |
| 2018/0143916 A1* | 5/2018 | Gupta | G06F 13/385 |
| 2019/0392548 A1* | 12/2019 | Nakata | G06F 13/20 |

* cited by examiner

700

```
┌─────────────────────────────────────────┐
│ Detect a device connection to a port of a│  702
│ ThunderBolt controller                   │
└─────────────────────────────────────────┘
                  ↓
┌─────────────────────────────────────────┐
│ Perform handshake with device            │  704
└─────────────────────────────────────────┘
                  ↓
┌─────────────────────────────────────────┐
│ Obtain an identifier for the device      │  706
└─────────────────────────────────────────┘
                  ↓
┌─────────────────────────────────────────┐
│ Perform lookup of the identifier for the │
│ device in a stored list of identifiers   │  708
│ correlating a device with a graphics     │
│ processor preference                     │
└─────────────────────────────────────────┘
                  ↓
┌─────────────────────────────────────────┐
│ Identify graphics processor for connected│  710
│ device based on lookup                   │
└─────────────────────────────────────────┘
                  ↓
┌─────────────────────────────────────────┐
│ Determine link lane count, lane datarate,│
│ and perform link training on link between│  712
│ monitor and preferred graphics           │
└─────────────────────────────────────────┘
                  ↓
┌─────────────────────────────────────────┐
│ Logically couple connected device to     │  714
│ preferred graphics processor             │
└─────────────────────────────────────────┘
```

*FIG. 7*

METHOD, APPARATUS, SYSTEM FOR THUNDERBOLT-BASED DISPLAY TOPOLOGY FOR DUAL GRAPHICS SYSTEMS

BACKGROUND

Hybrid or dynamic mode switchable graphics cards use shared common frame buffers, where rendering is either on external graphics cards (eGFx) or internal graphics cards (iGFx), depending on the type of device connected, the applications, and/or system power requirements. Fixed mode switchable graphics solutions rely on iGFx or eGFx based on system power changes or user configurations and use a designated frame buffer for display. Fixed mode switchable graphics can switch based on applications requirements or the connected device.

BRIEF DESCRIPTION OF THE DRAWINGS

FIG. 7 is an example process flow diagram for using a ThunderBolt controller to switch between internal and external graphics in accordance with embodiments of the present disclosure.

The figures may not be drawn to scale. Like reference numbers denote like elements across the different figures.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages, and operation, etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

Figure 1:
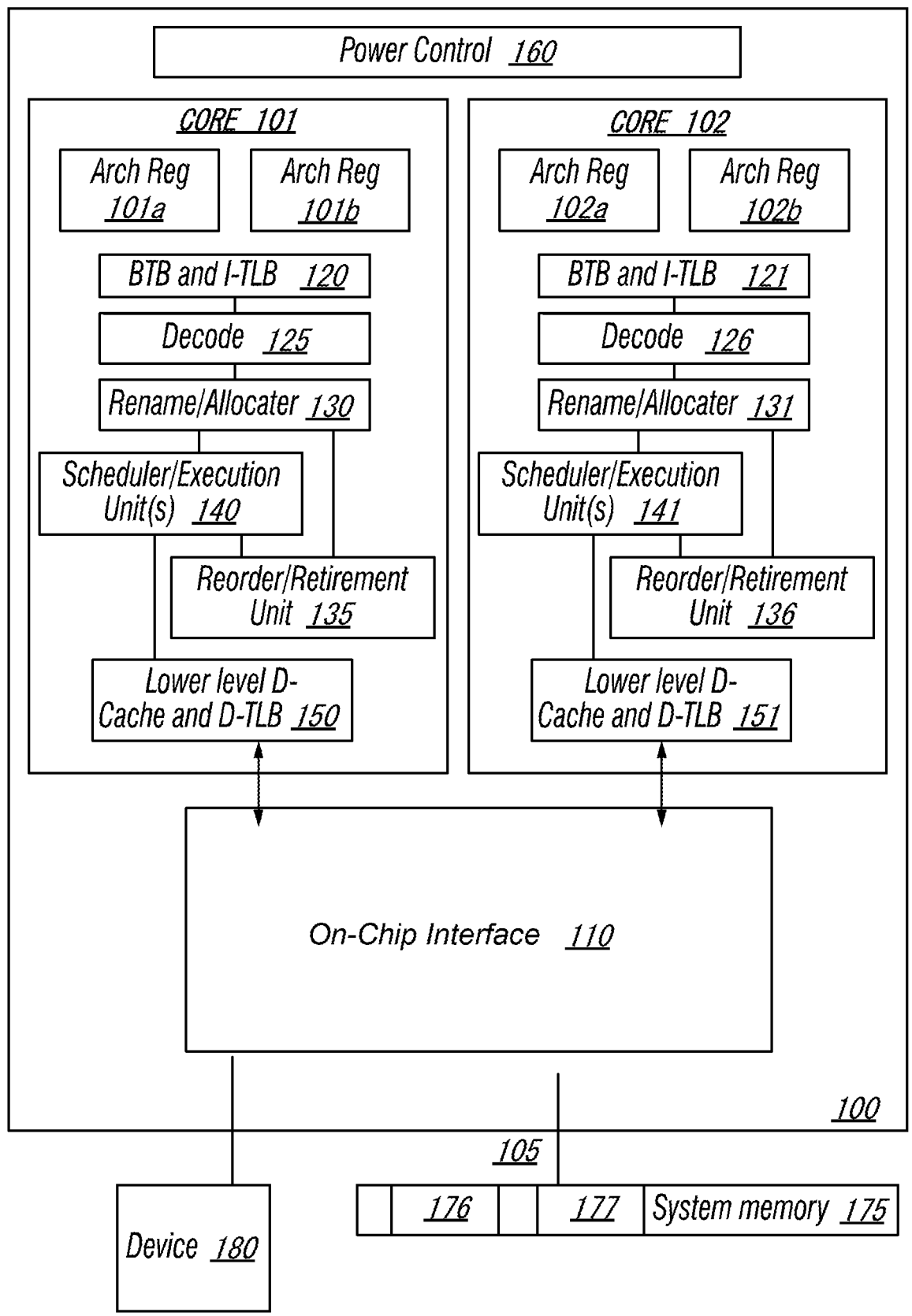
FIG. 1 illustrates an embodiment of a block diagram for a computing system including a multicore processor.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating-point instruction is scheduled on a port of an execution unit that has an available floating-point execution unit. Register files associated with the execution units are also included to store information instruction processing results. Exemplary execution units include a floating-point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example, in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Thunderbolt (TBT) adoption is ever increasing and is becoming desirable feature across computer platforms. TBT offers convenience for end users and flexibility for OEMs in design. For example, a Virtual Reality Headset can use up to four different connectors, with a cable that includes many wires to support video, audio, data transfer, etc. With TBT, one connector could be used for all functions.

This disclosure describes combining TBT with dual graphics cards. Aspects of the present disclosure facilitate a compact system with an increase in graphical performance. Advantages of the present disclosure are readily apparent to those of skill in the art. Among the advantages are that external multiplexers (MUXes) for a single TBT output port can be reduced or eliminated. The distribution logic for the MUX switching is no longer used, and, as a result, reduces deadlock in certain operational modes. The switch from one graphics card to another will be faster, and link training and hotplug detection will be used once, thereby reducing latency. The switching between graphics cards can be performed based on the type of the connected device and/or the application that is running.

In embodiments, the TBT controller can use early interception of subsystem vendor identifiers (SVID), which further reduces graphics switch latency. Aspects of the present disclosure also facilitate scalability for multiple Type-C ports and/or multiple TBT controllers by the use of external MUXes and/or retimers.

Figure 2:
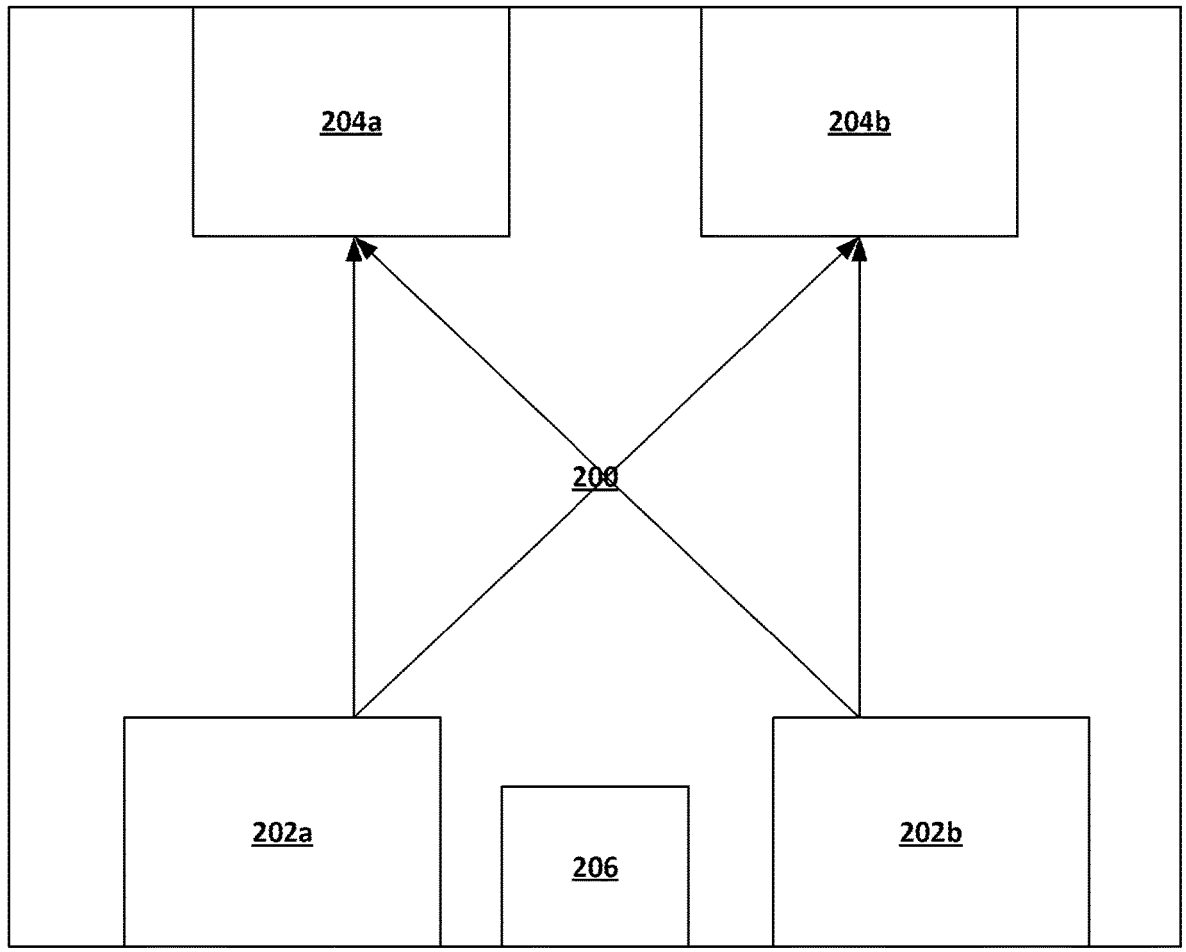
FIG. 2 is a schematic diagram of an example ThunderBolt controller in accordance with embodiments of the present disclosure.

FIG. 2 is a schematic diagram of an example ThunderBolt controller subsystem 200 in accordance with embodiments of the present disclosure. ThunderBolt (TBT) controllers facilitate the combination Peripheral Component Interconnect express (PCIe) data transmission protocols and DisplayPort (DP) video streaming protocols to allow for the two protocols to be used in the same cable for transmitting data and video streams. TBT interfaces can be used as general-purpose connection interfaces between computers and other peripheral devices. The slots used by the TBT controllers are the same as mini DisplayPort slots, the TBT controller also supports DisplayPort interfaces.

For example, TBT controller subsystem 200 includes two Universal Serial Bus (USB) Type-C output ports 202a-202b, and two display ports 204a-204b. The TBT controller subsystem 200 can also include a third DP port 206. The DP links can be configured using non-volatile memory express (NVMe) firmware. The TBT controller subsystem 200 can logically couple each Type-C port 202a-202b to each DP.

Figure 3:
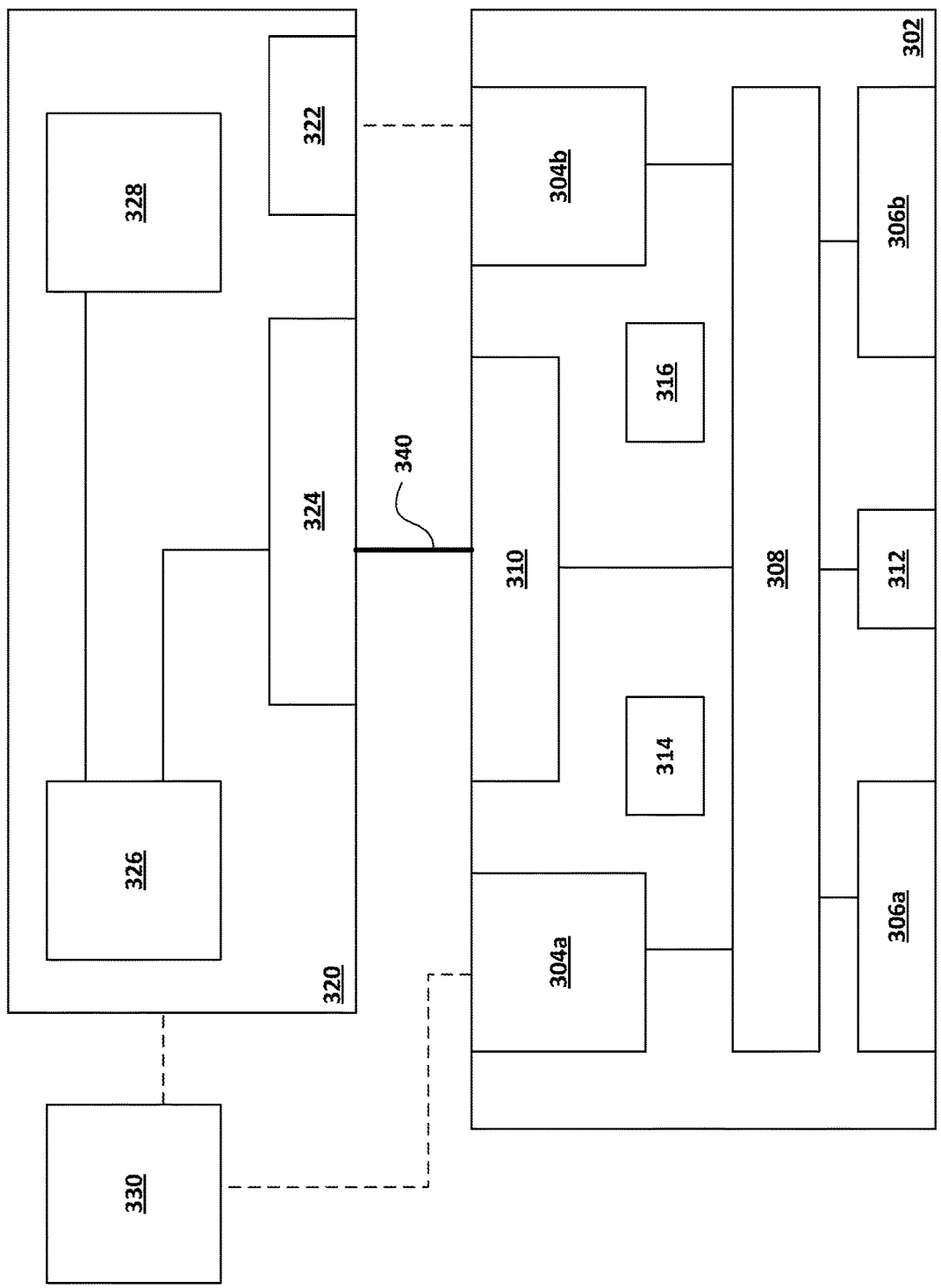
FIG. 3 is a schematic diagram of an example ThunderBolt controller connection layout in accordance with embodiments of the present disclosure.

FIG. 3 is a schematic diagram of an example ThunderBolt controller connection layout 300 in accordance with embodiments of the present disclosure. The ThunderBolt (TBT) controller subsystem 302 can include a single displayPort (DP) or can include multiple DPs, such as DP 304b and DP 312. The TBT controller subsystem can support single DP-in and DP-out and/or can support multiple DP-in/Single DP-out. For example, the TBT controller subsystem can include input DP 304a and input DP 304b, as well as output DP 312.

The TBT controller subsystem 302 can also include a Universal Serial Bus (USB) Type-C port 306a, referred to herein as a Type-C port for short. In embodiments, the TBT controller subsystem 302 can include a second Type-C port 306b. In embodiments, a switching circuit 308 can switch between DP 304a and DP 304b.

The TBT controller subsystem 302 includes switching circuit 308. The switching circuit can be a multiplexer circuit that is controlled by the TBT controller subsystem firmware or software. Switching circuit 308 can be controlled to logically link a Type-C port 306a to a displayPort 304a, for example. Switching circuit 308 can also be controlled to switch the logical link of a Type-C port 306a between a first displayPort 304a and a second displayPort 304b.

The TBT controller subsystem 302 also includes a TBT firmware (FW) 314 implemented at least partially in hardware logic to manage the links between the ports. The TBT FW 314 can also be configured to establish links between the ports based on addressing information, such as IP address information, and can control the switching circuit to logically couple a connected device (e.g., monitor 350) attached to a Type-C port 306a to a displayPort (304a or 304b).

The TBT controller subsystem 302 also includes a memory element 316. Memory element 316 can be a scratch-pad memory (e.g., a small storage element, such as a 4 KB storage element) or a cache memory. The memory element 316 can store a list of processor preference identifiers that correlate a device with a preferred graphics processor. For example, the memory element 316 can store a whitelist of processor preference identifiers that the TBT FW 314 (or more generally, the TBT controller subsystem 302) can use to identify a preferred graphics processor for a connected device (e.g., monitor 350).

The TBT controller subsystem 302 includes a PCIe port 310. The TBT controller subsystem 302 can be coupled to a processor core 320 across a link compliant with the Peripheral Component Interconnect express (PCIe) protocol, such as a ThunderBolt link 340. The processor core 320 can also include a PCIe port 324, as well as a PCIe root complex for controlling PCIe compliant links.

The TBT link 340 can facilitate data and display transmissions between the monitor 350 and the processor core 320. In embodiments, processor core 320 can include an internal graphics processor 322. Internal graphics processor 322 can be a PCIe compliant device. The internal graphics processor 322 can be part of a system-on-chip design with the processor core 320, or can be a PCIe connected device connected to the processor core 320 by a PCIe compliant link. An external graphics card (or board) 330 can be connected to the processor core 320 across a PCIe compliant link. The external graphics card 330 can include a dedicated graphics processor, random access memory, and PCIe compliant infrastructure for data transfer through the TBT controller subsystem 302 to a monitor 350.

The processor core 320 also includes a processor memory 328. Processor memory 328 can store graphics processor preference information that the TBT firmware (FW) 314 can obtain from a handshake operation with the monitor 350. The graphics processor preference information can include an extended display identifier data (EDID), a subsystem vendor identifier (SVID), application name for an application running in the connected device, or other identifier that can be used to determine a graphics processor preference for the connected device.

The monitor 350 or an application running that uses the TBT FW 314 can have a preference or be more compatible with one of the internal graphics processor 322 or the external graphics card 330. For example, a high definition monitor may be need the extra processing speed or power provided by the external graphics card 330. The TBT controller subsystem 302 can facilitate a connection with an appropriate choice of graphics once after the monitor handshake is performed, which can reduce connection latency time and improve the user experience.

The TBT controller subsystem 302 can switch links dynamically based on an obtained processor preference indicator (e.g., EDID, SVID, application name, etc.) received from either the TBT firmware 314 or from TBT software 326 in BIOS, or based on an application running in the operating system from the TBT software 326 such as TBT drivers, operating systems, BIOS, etc. The EDID can include a Vendor ID (VID) and Product ID (PID). The EDID information and/or application name can be "white-listed" in memory element 316 to switch to external graphics. The whitelist can be maintained and updated either by a driver setting or automatically over the network. The memory element 316 can be a TBT scratch pad of 4 KB for the VID/PID whitelist.

Figure 4:
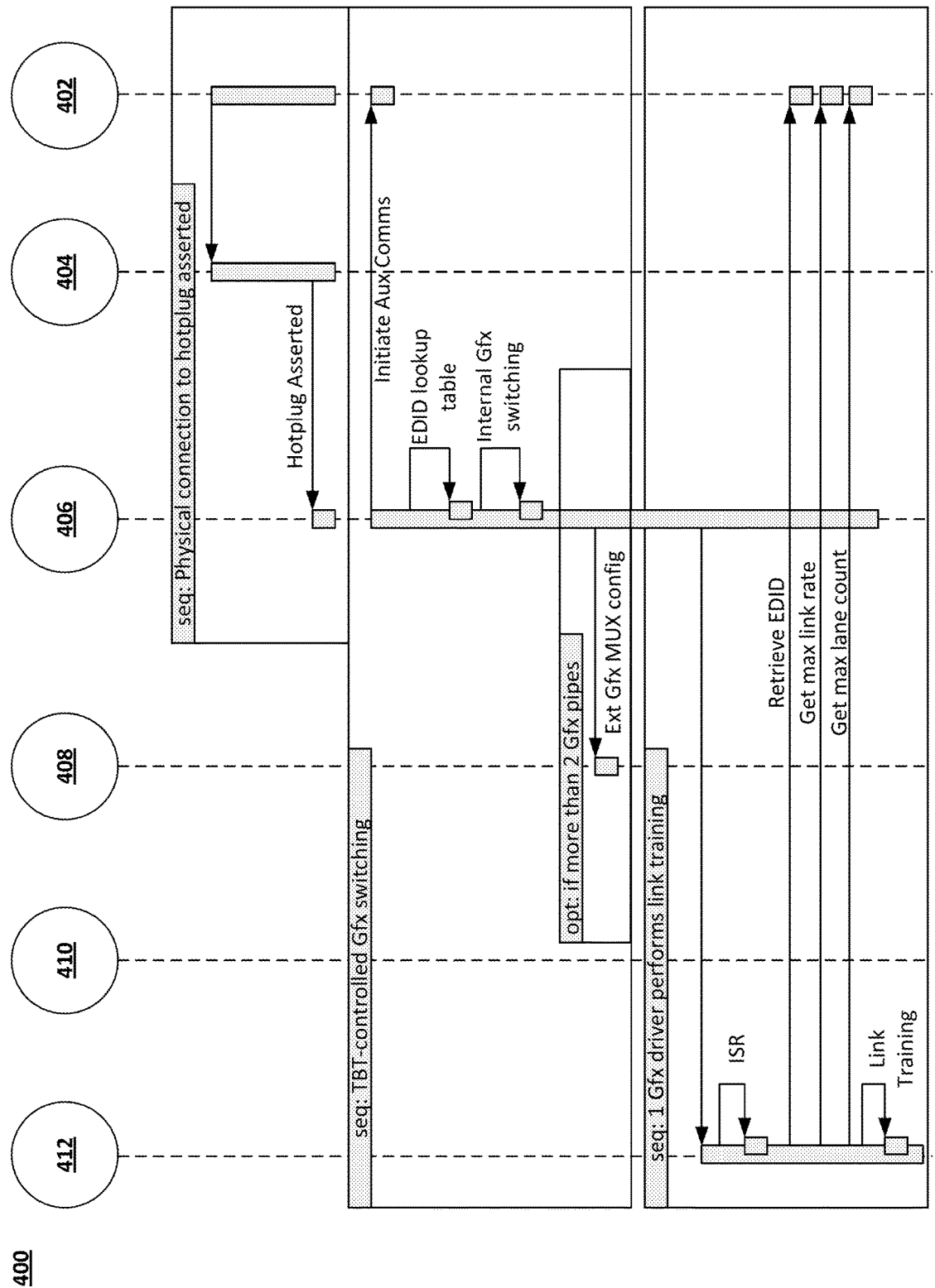
FIG. 4 is a swim-lane diagram illustrating operation sequences for a ThunderBolt-assisted graphics switching using auxiliary interception in accordance with embodiments of the present disclosure.

FIG. 4 is a swim-lane diagram 400 illustrating operation sequences for a ThunderBolt-assisted graphics switching using extended display identity data (EDID) in accordance with embodiments of the present disclosure. TBT FW 406 detects a presence of a device connected to its port and when it receives the hotplug detect (HPD) over the displayPort DP, or virtual HPD over Type-C port, the TBT controller obtains the EDID information from the display, processes the EDID, and uses the EDID information to determine if the device requires internal or external graphics. Based on this information, TBT controller software (which can be at least partially implement in a TBT FW 314) can control the internal switching circuit 308 that routes HPD and DDI signals to either internal or external graphics processors. The use of the EDID facilitates the generation of one HPD, thereby reducing the latency involved in the link training, monitor detection, and the need for external multiplexers.

At the outset, a port partner 402, such as a TBT dock or TBT dongle that includes a Type-C compliant infrastructure and a TBT controller subsystem, can receive an indication that a monitor has been attached to a port of the port partner 402 (or that an application is being run that could trigger a change in the graphics). A power delivery (PD) controller 404 can detect that a hotplug has been asserted by the monitor. The TBT FW 406 on the TBT controller subsystem can initiate a handshake with the port partner 402. The handshake can result in the port partner 402 providing an extended display identity data (EDID) to the TBT FW 406. The TBT FW 406 can perform an EDID look up in a memory (e.g., by a TBT FW). The TBT FW can then determine, based on the EDID look up, which graphics processor (either internal graphics or external graphics) to connect the monitor to by controlling the switching element to route signaling to the appropriate graphics processor.

In the example shown in FIG. 4, the EDID lookup causes the TBT controller to switch to an external graphics. The TBT FW 406 can send a hotplug interrupt to the external graphics driver 412. The external graphics driver 412 can perform the interrupt service request (ISR). The external graphics driver 412 can retrieve the EDID information from the connected monitor through the port partner 402 to begin configuring the external graphics to support the monitor. For example, the external graphics driver 412 can then determine link conditions between the external graphics driver 412 and the monitor, such as maximum link rate and maximum link count. The external graphics driver 412 can also perform link training and begin servicing the monitor.

In some embodiments, the TBT controller can make use of an external multiplexer 408. For example, and as described in FIG. 6A-C, for scalability, an external multiplexer can be used to aid in connecting multiple connected devices to an appropriate graphics processor. In scenarios where an external multiplexer is used, the TBT FW 406 can control external MUX 408 to direct signals between the connected device and the appropriate graphics processor.

Figure 5:
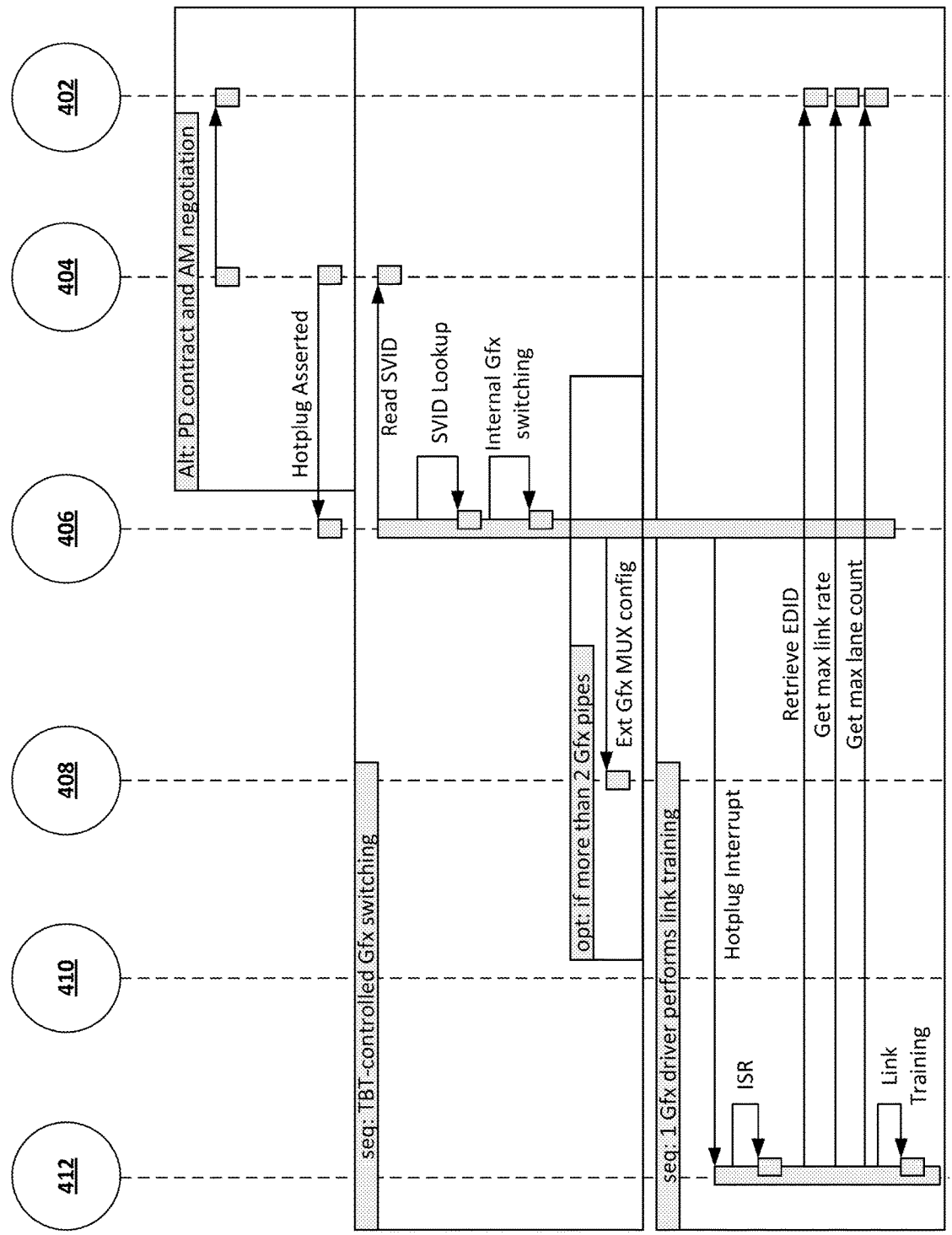
FIG. 5 is a swim-lane diagram illustrating operation sequences for a ThunderBolt-assisted graphics switching with a power delivery subsystem vendor identifier (PD SVID) in accordance with embodiments of the present disclosure.

FIG. 5 is a swim-lane diagram illustrating operation sequences for a ThunderBolt-assisted graphics switching with a power delivery (PD) controller subsystem vendor identifier (PD SVID) in accordance with embodiments of the present disclosure. The PD controller 404 can be used to trigger the handshake between a connected device and the port partner 402. The PD controller 404 can receive the SVID from the port partner 402, and provide the SVID to the TBT FW 406. The TBT FW 406 can perform a lookup in a locally stored whitelist (local to the TBT controller) using the SVID as a graphics processor preference identifier for the preferred graphics processor type (e.g., eGFx or iGFx). The use of an SVID retrieved from the PD controller 404 can be an alternative to using an EDID retrieved from the TBT BIOS or OS.

Figure 6A:
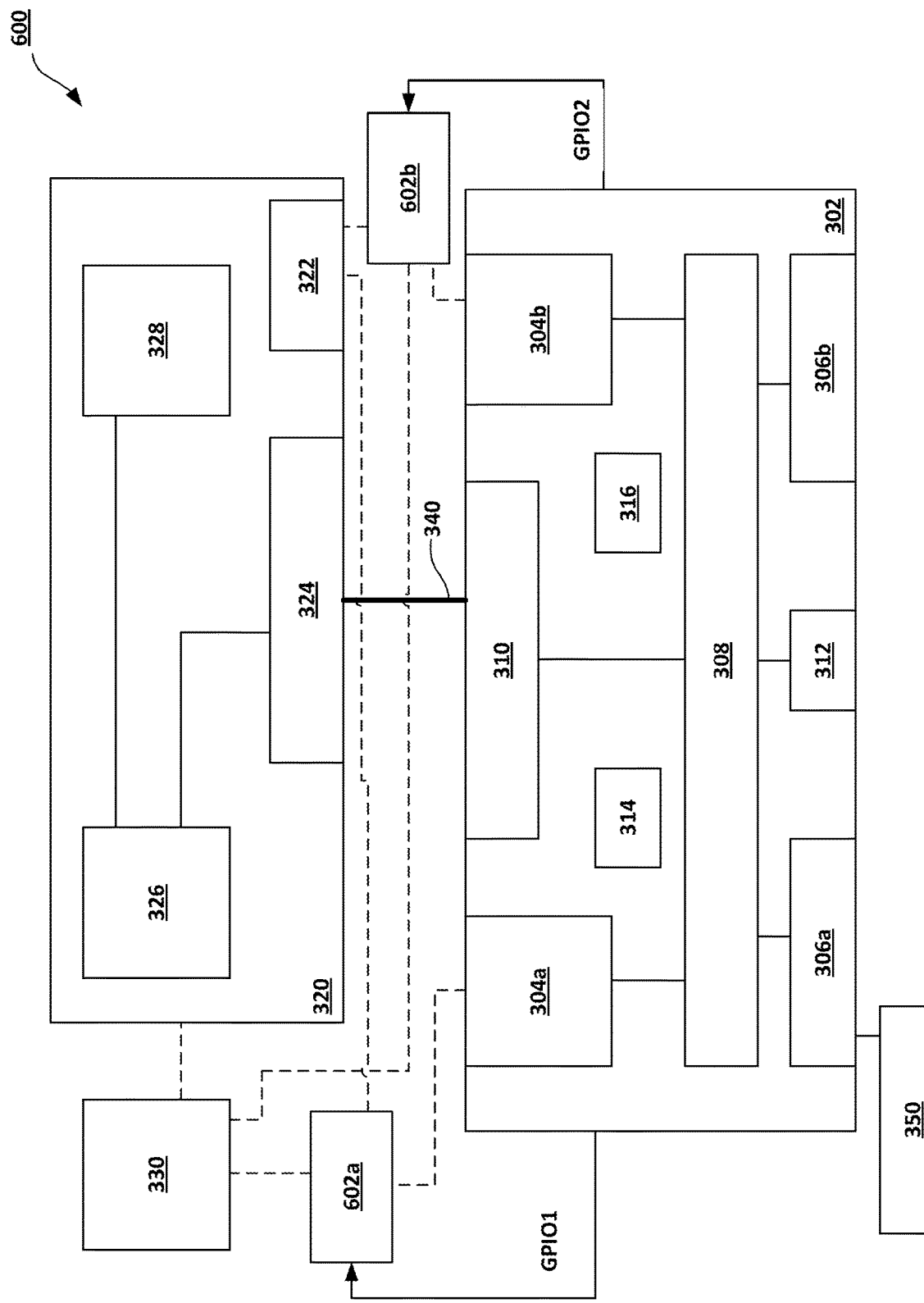
FIG. 6A is a schematic diagram of an example ThunderBolt controller connection layout using multiple type-C ports in accordance with embodiments of the present disclosure.

FIG. 6A is a schematic diagram of an example Thunder-Bolt controller connection layout 600 using multiple type-C ports in accordance with embodiments of the present disclosure. ThunderBolt controllers can facilitate scalability to support multiple monitors. To utilize two thunderbolt Type-C ports 306a and 306b, an external mux 602a and/or 602b can be used. The TBT FW 314 can detect a presence of a device connected to a Type-C port 306a, and when the TBT FW 314 receives an HPD over Type-C port 306a, or virtual HPD over Type-C port 306a, the TBT FW 314 obtains an EDID, processes the EDID information from the display and uses the EDID information to determine if the device requires internal graphics processor 322 or external graphics card 330. Based on the graphics processor preference information, the TBT FW 314 can control the external mux 602a or 602b to route HPD and DDI signals to either internal graphics processor 322 or external graphics card 330. The external multiplexer 602a and 602b can be a single multiplexer or can be multiple multiplexers. The external multiplexer can be located within the processor core or inside the packaging for the TBT controller subsystem 302. The external multiplexer 602a/602b can be controlled by the TBT controller through a general purpose I/O.

Figure 6B:
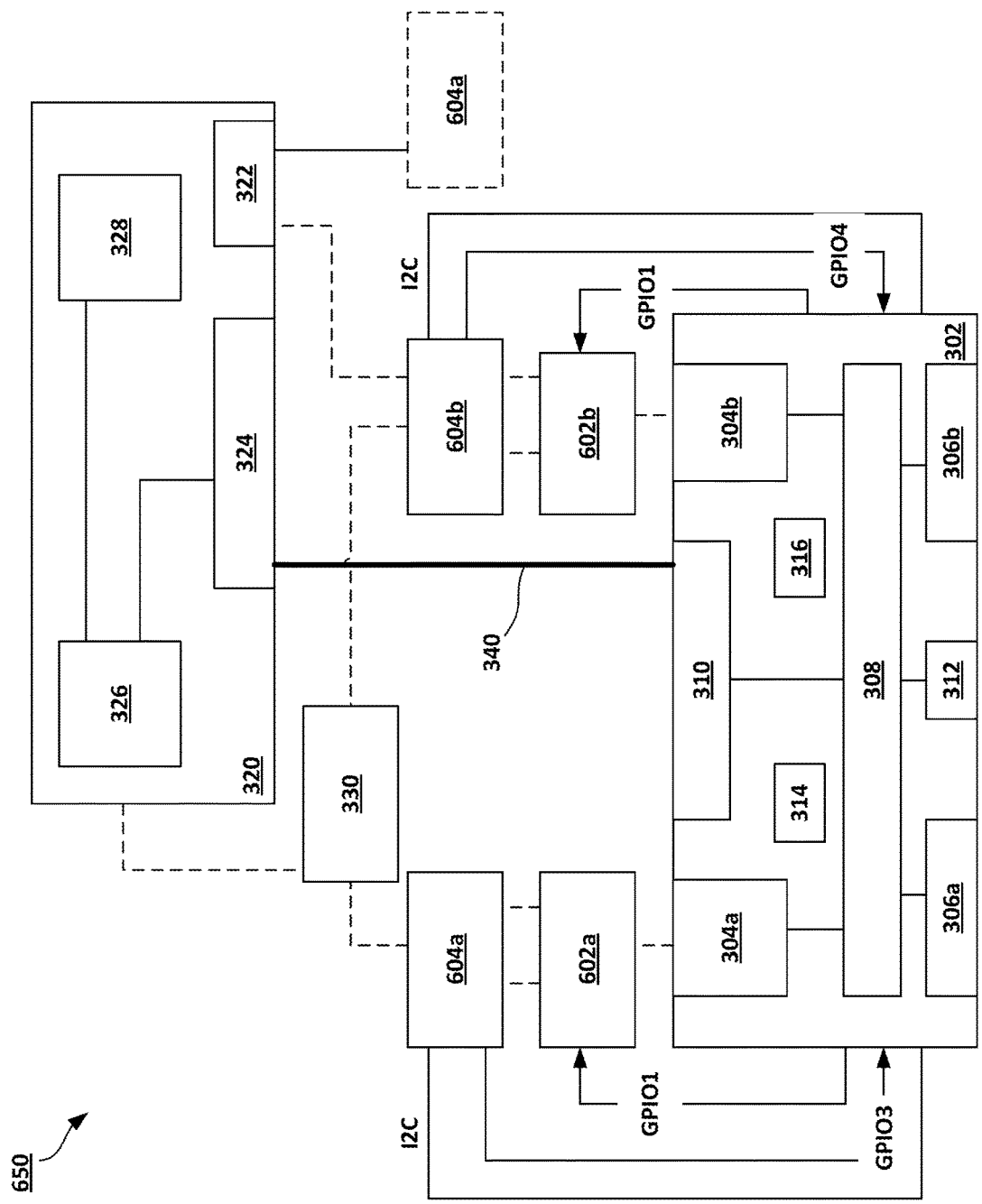
FIG. 6B is a schematic diagram of an example ThunderBolt controller connection layout using ThunderBolt controlled retimers in accordance with embodiments of the present disclosure.

FIG. 6B is a schematic diagram of an example Thunder-Bolt controller connection layout 650 using ThunderBolt controlled retimers in accordance with embodiments of the present disclosure. The TBT controller connection layout 650 is similar to that shown in FIG. 6A. The external multiplexer 602a can be connected to a retimer circuit element 604a. Likewise, other external multiplexers, such as external multiplexer 602b can be connected to a retimer 604b.

The retimer can help facilitate an improvement in signal integrity. The thunderbolt controller can control external retimers 604a and 604b with the master I2C bus, which is the same bus that is used to control the PD controllers (not shown).

Figure 6C:
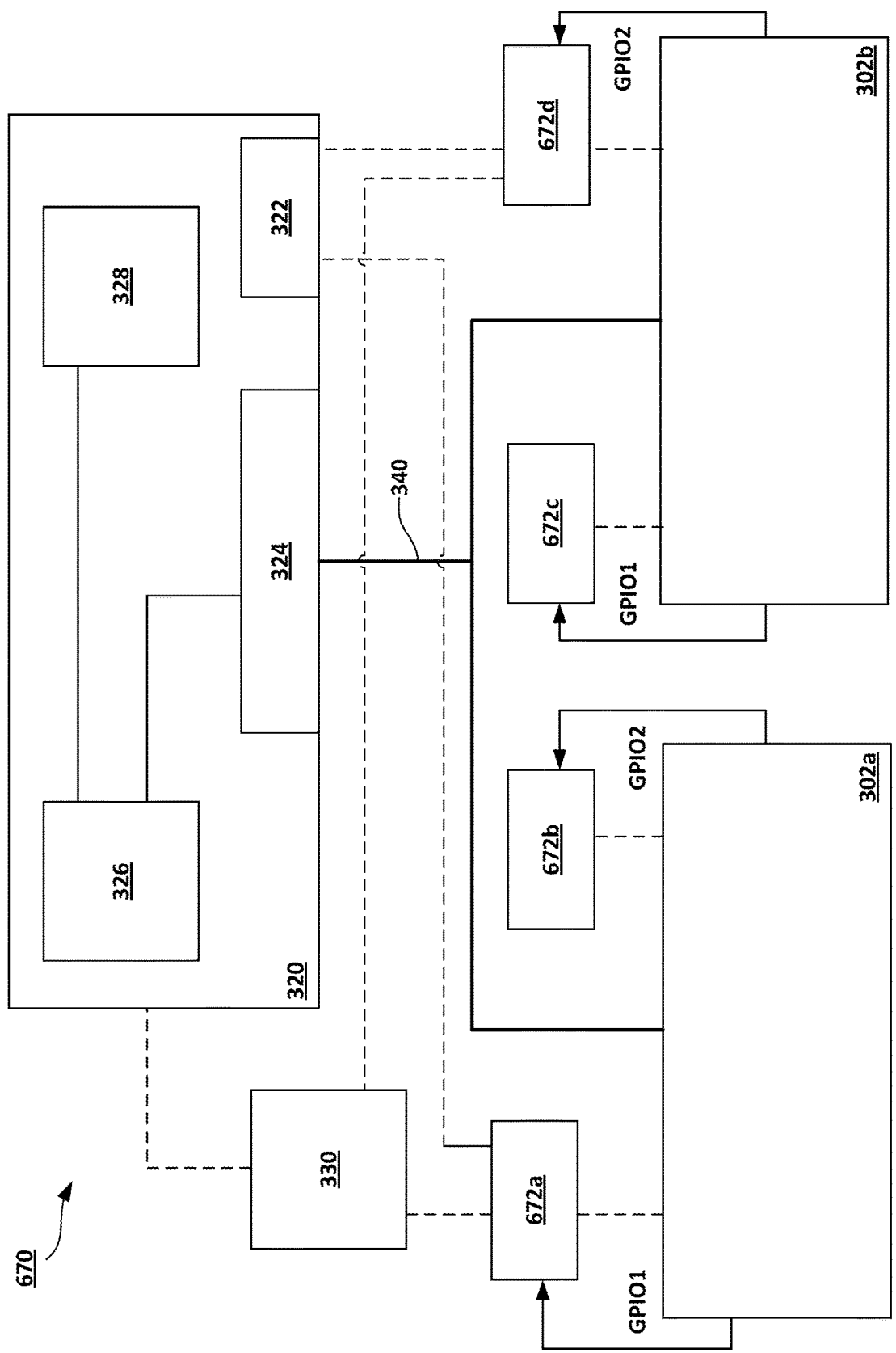
FIG. 6C is a schematic diagram of an example ThunderBolt controller connection layout using multiple ThunderBolt controllers in accordance with embodiments of the present disclosure.

FIG. 6C is a schematic diagram of an example Thunder-Bolt controller connection layout 670 using multiple Thun-derBolt controllers in accordance with embodiments of the present disclosure. As mentioned before, TBT controller subsystem 302 can be used for scalability. In FIG. 6C, multiple TBT controller subsystems 302a and 302b are used to connect four or more displays to one or more graphics cards.

The TBT controller subsystems 302a and 302b includes the features of TBT controller subsystem 302 described above. Each TBT controller subsystem 302a and 302b can independently switch between internal and external graphics processing using the EDID, SVID, or application name whitelist stored in each controllers respective memory elements. The layout 670 can make use of external multiplexers 672a-672d to help in switching between the internal graphics processor 322 and the external graphics card 330. TBT controller subsystem 302a can control external mux 672a and 672b through a GPIO connection. Likewise, TBT controller subsystem 302b can control external mux 672c and 672d through a GPIO connection. The two TBT controller subsystems 302a and 302b can communicate with the processor core 320 across a PCIe compliant link 340.

FIG. 7 is an example process flow diagram 700 for using a ThunderBolt controller to switch between internal and external graphics in accordance with embodiments of the present disclosure. At the outset, a TBT controller can detect a device connection to a port of the ThunderBolt controller (702). The TBT controller can coordinate a handshake operation with the connected device (704). As a result of the handshake operation, the TBT FW can obtain a graphics processor preference identifier from the connected device (706). The graphics processor preference identifier can be an EDID, such as VID or PID of the monitor. In embodiments, the TBT FW can use an application name as a graphics processor preference identifier.

The TBT controller can look up the graphics processor preference identifier in a whitelist or other object stored in a memory element (708). For example, the TBT controller can perform a lookup of the identifier for the device in a stored list of identifiers correlating a device with a graphics processor preference. The TBT controller can identify a graphics processor (either internal graphics processor or external graphics processor) based on the lookup (710).

The graphics driver can then retrieve information from the device (e.g., EDID). The graphics driver can use that information to determine maximum lane count, maximum lane rate, and can perform link training (712). The device can then be logically coupled to the selected graphics processor (714).

Figure 8:
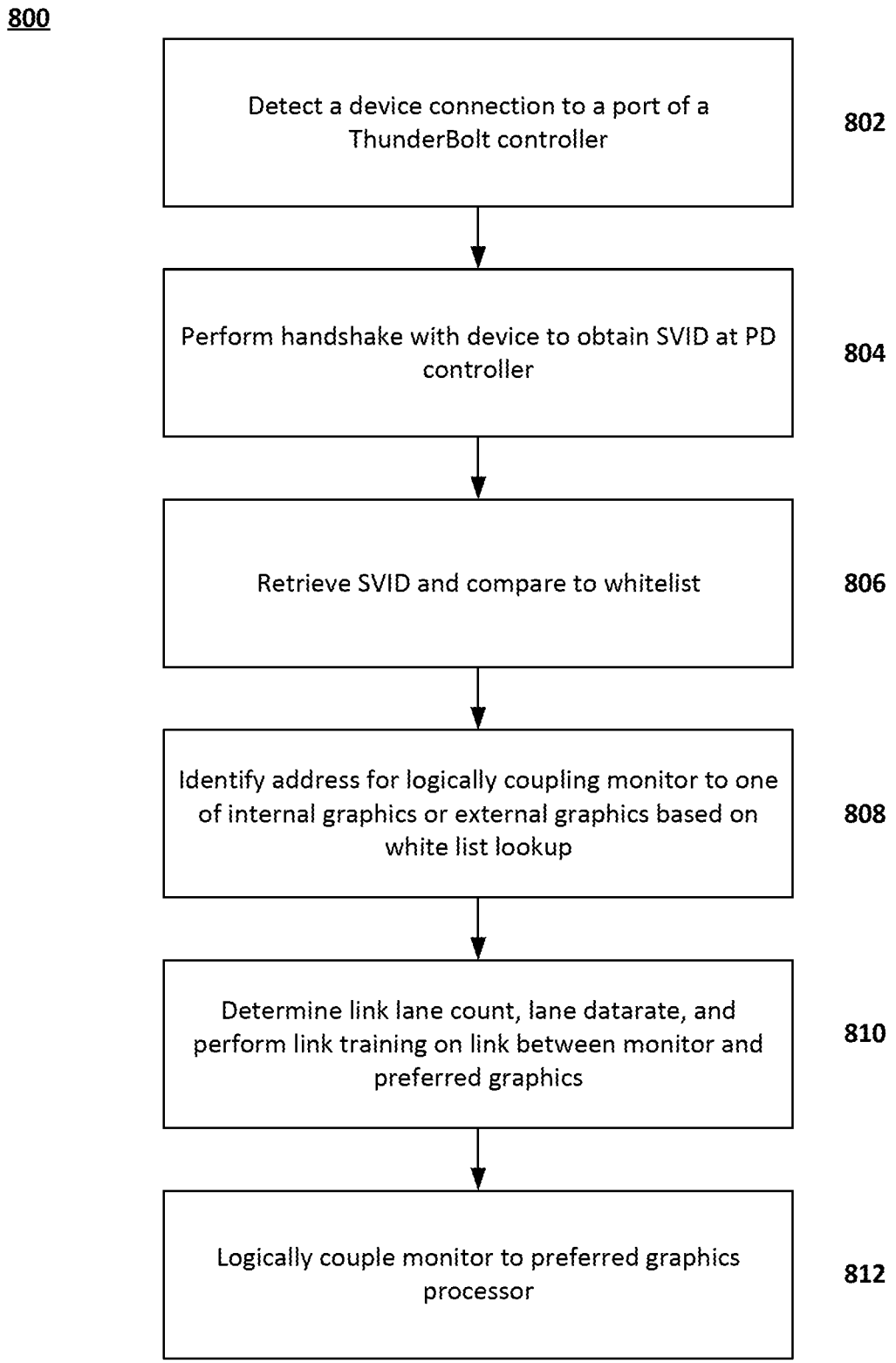
FIG. 8 is another example process flow diagram for using a ThunderBolt controller to switch between internal and external graphics in accordance with embodiments of the present disclosure.

FIG. 8 is another example process flow diagram for using a ThunderBolt controller to switch between internal and external graphics in accordance with embodiments of the present disclosure. At the outset, a TBT controller can detect a device connection to a port of the ThunderBolt controller (802). The TBT controller can coordinate a handshake operation with the connected device (804). As a result of the handshake operation, the TBT FW can obtain a subsystem vendor identifier (SVID) from a power delivery controller coupled to the connected device (806). The TBT controller can look up the SVID in a whitelist or other object stored in a memory element (808). For example, the TBT controller can perform a lookup of the identifier for the device in a stored list of SVIDs correlating a device with a graphics processor preference. The TBT controller can identify a graphics processor (either internal graphics processor or external graphics processor) based on the lookup (810).

The graphics driver can then retrieve information from the device (e.g., EDID). The graphics driver can use that information to determine maximum lane count, maximum lane rate, and can perform link training (812). The device can then be logically coupled to the selected graphics processor (814).

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCIe is a high performance, general purpose I/O interconnect protocol defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCIe protocols take advantage of advances in point-to-point interconnects, switch-based technology, and packetized protocol to deliver new levels of performance and features. Power Management, Quality of Service (QoS), Hot-Plug/Hot-Swap support, Data Integrity, and Error Handling are among some of the advanced features supported by PCI Express.

Figure 9:
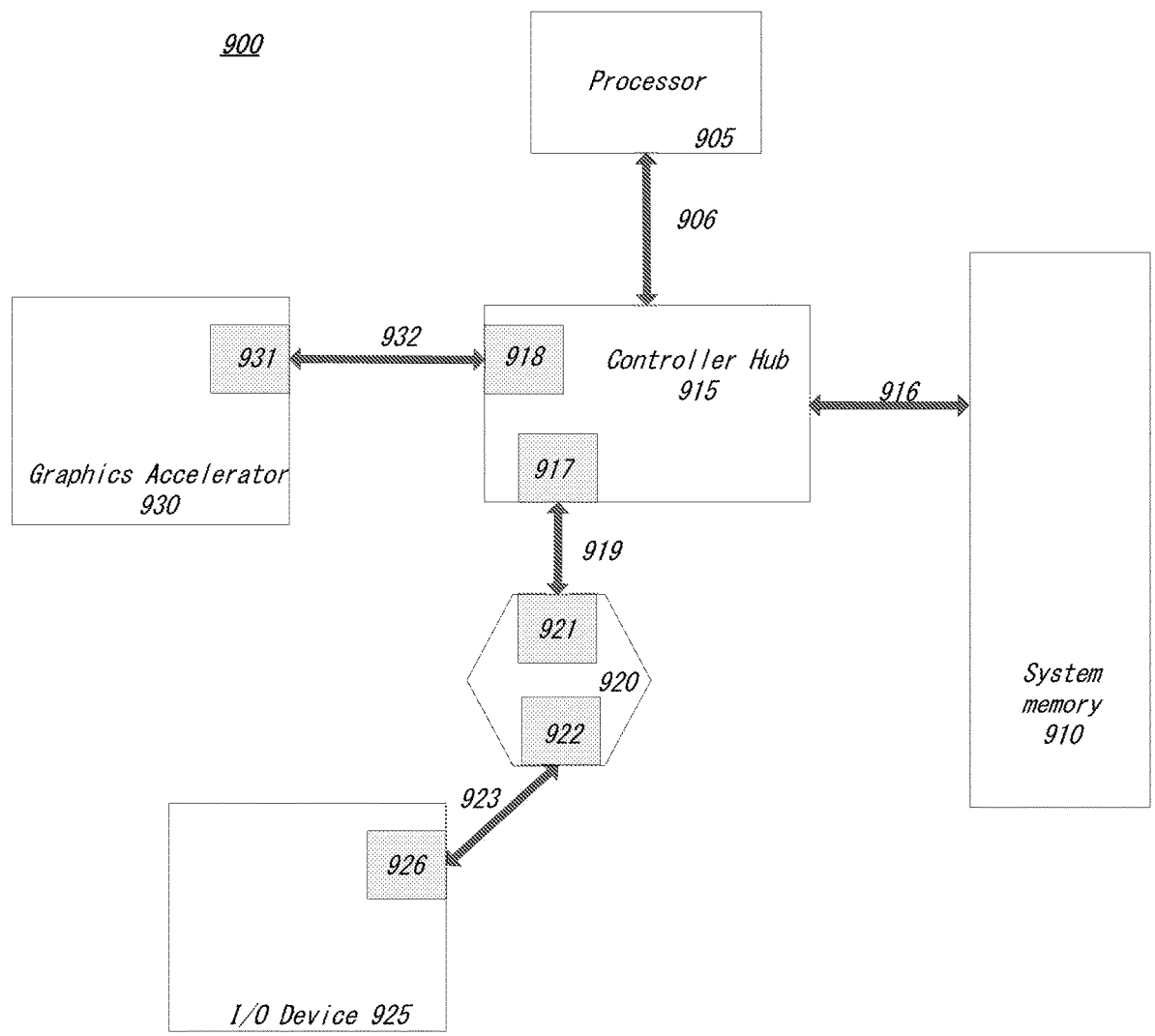
FIG. 9 illustrates an embodiment of a computing system including an interconnect architecture.

Referring to FIG. 9, an embodiment of a fabric composed of point-to-point Links that interconnect a set of components is illustrated. System 900 includes processor 905 and system memory 910 coupled to controller hub 915. Processor 905 includes any processing element, such as a microprocessor, a host processor, an embedded processor, a co-processor, or other processor. Processor 905 is coupled to controller hub 915 through front-side bus (FSB) 906. In one embodiment, FSB 906 is a serial point-to-point interconnect as described below. In another embodiment, link 906 includes a serial, differential interconnect architecture that is compliant with different interconnect standard.

System memory 910 includes any memory device, such as random access memory (RAM), non-volatile (NV) memory, or other memory accessible by devices in system 900. System memory 910 is coupled to controller hub 915 through memory interface 916. Examples of a memory interface include a double-data rate (DDR) memory interface, a dual-channel DDR memory interface, and a dynamic RAM (DRAM) memory interface.

In one embodiment, controller hub 915 is a root hub, root complex, or root controller in a Peripheral Component Interconnect Express (PCIe or PCIE) interconnection hierarchy. Examples of controller hub 915 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 905, while controller 915 is to communicate with I/O devices, in a similar manner as described below. In some embodiments, peer-to-peer routing is optionally supported through root complex 915.

Here, controller hub 915 is coupled to switch/bridge 920 through serial link 919. Input/output modules 917 and 921, which may also be referred to as interfaces/ports 917 and 921, include/implement a layered protocol stack to provide communication between controller hub 915 and switch 920. In one embodiment, multiple devices are capable of being coupled to switch 920.

Switch/bridge 920 routes packets/messages from device 925 upstream, i.e. up a hierarchy towards a root complex, to controller hub 915 and downstream, i.e. down a hierarchy away from a root controller, from processor 905 or system memory 910 to device 925. Switch 920, in one embodiment, is referred to as a logical assembly of multiple virtual PCI-to-PCI bridge devices. Device 925 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 925 may include a PCIe to PCI/PCI-X bridge to support legacy or other version PCI devices. Endpoint devices in PCIe are often classified as legacy, PCIe, or root complex integrated endpoints.

Graphics accelerator 930 is also coupled to controller hub 915 through serial link 932. In one embodiment, graphics accelerator 930 is coupled to an MCH, which is coupled to an ICH. Switch 920, and accordingly I/O device 925, is then coupled to the ICH. I/O modules 931 and 918 are also to implement a layered protocol stack to communicate between graphics accelerator 930 and controller hub 915. Similar to the MCH discussion above, a graphics controller or the graphics accelerator 930 itself may be integrated in processor 905.

Figure 10:
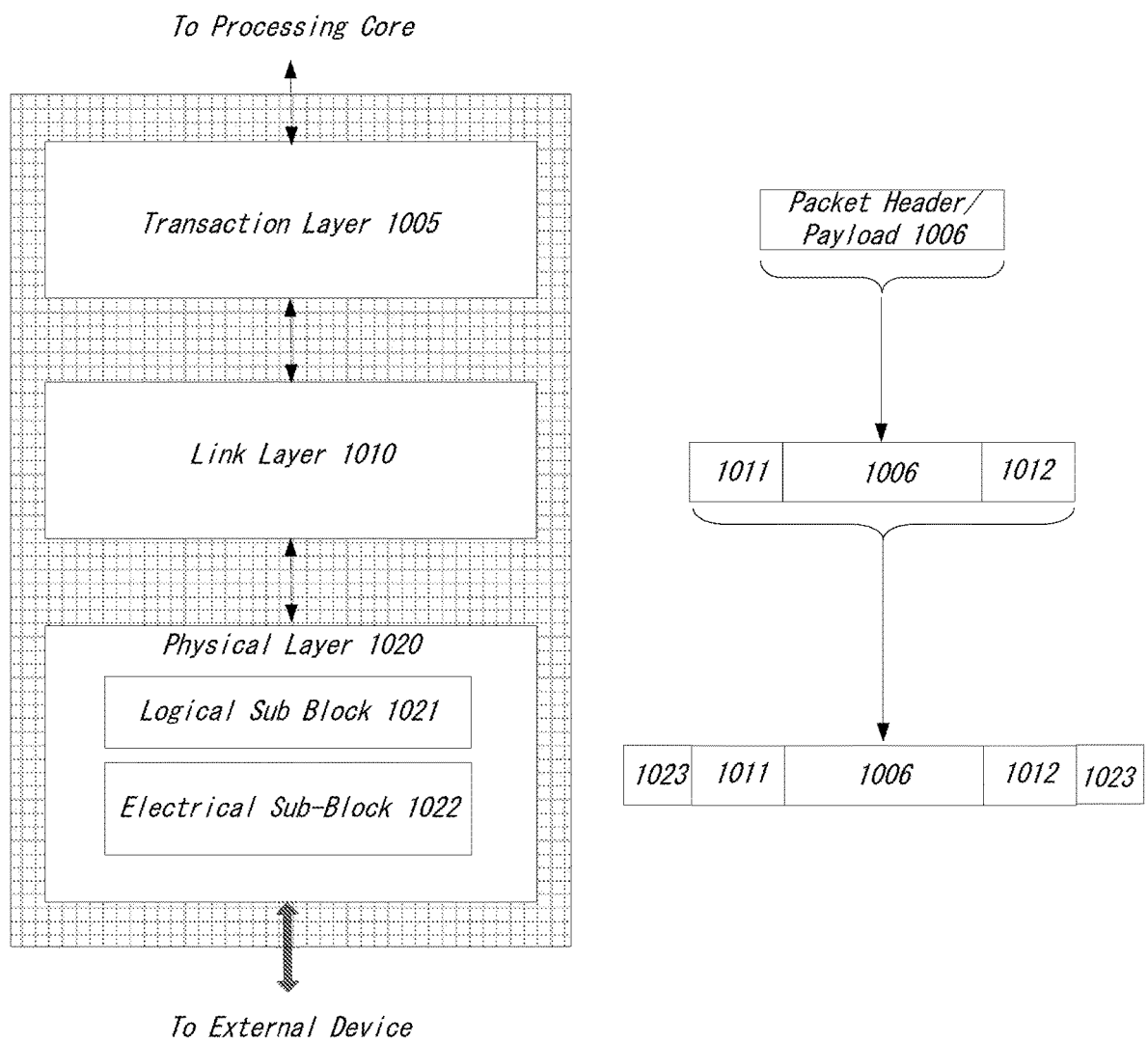
FIG. 10 illustrates an embodiment of an interconnect architecture that includes a layered stack.
Figure 11:
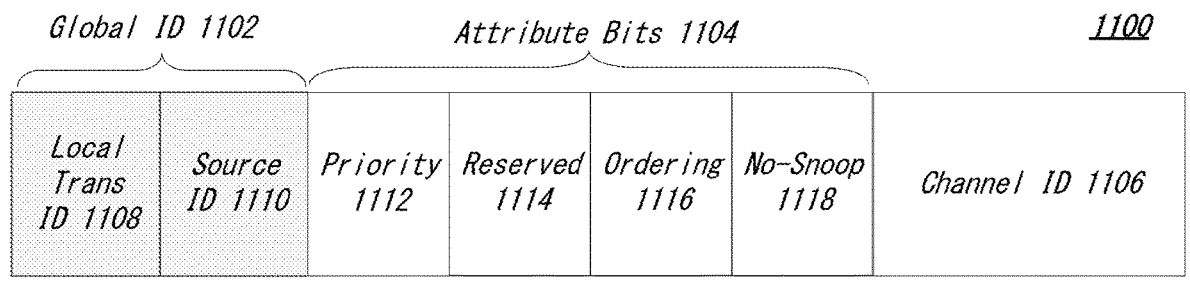
FIG. 11 illustrates an embodiment of a request or packet to be generated or received within an interconnect architecture.

Turning to FIG. 10 an embodiment of a layered protocol stack is illustrated. Layered protocol stack 1000 includes any form of a layered communication stack, such as a Quick Path Interconnect (QPI) stack, a PCIe stack, a next generation high performance computing interconnect stack, or other layered stack. Although the discussion immediately below in reference to FIGS. 9-11 are in relation to a PCIe stack, the same concepts may be applied to other interconnect stacks. In one embodiment, protocol stack 1000 is a PCIe protocol stack including transaction layer 1005, link layer 1010, and physical layer 1020. An interface, such as interfaces 917, 918, 921, 922, 926, and 931 in FIG. 1, may be represented as communication protocol stack 1000. Representation as a communication protocol stack may also be referred to as a module or interface implementing/including a protocol stack.

PCI Express uses packets to communicate information between components. Packets are formed in the Transaction Layer 1005 and Data Link Layer 1010 to carry the information from the transmitting component to the receiving component. As the transmitted packets flow through the other layers, they are extended with additional information necessary to handle packets at those layers. At the receiving side the reverse process occurs and packets get transformed from their Physical Layer 1020 representation to the Data Link Layer 1010 representation and finally (for Transaction Layer Packets) to the form that can be processed by the Transaction Layer 1005 of the receiving device.

Transaction Layer

In one embodiment, transaction layer 1005 is to provide an interface between a device's processing core and the interconnect architecture, such as data link layer 1010 and physical layer 1020. In this regard, a primary responsibility of the transaction layer 1005 is the assembly and disassembly of packets (i.e., transaction layer packets, or TLPs). The translation layer 1005 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1005. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1005 assembles packet header/payload 1006. Format for current packet headers/payloads may be found in the PCIe specification at the PCIe specification website.

Quickly referring to FIG. 11, an embodiment of a PCIe transaction descriptor is illustrated. In one embodiment, transaction descriptor 1100 is a mechanism for carrying transaction information. In this regard, transaction descriptor 1100 supports identification of transactions in a system. Other potential uses include tracking modifications of default transaction ordering and association of transaction with channels.

Transaction descriptor 1100 includes global identifier field 1102, attributes field 1004 and channel identifier field 1106. In the illustrated example, global identifier field 1102 is depicted comprising local transaction identifier field 1108 and source identifier field 1110. In one embodiment, global transaction identifier 1102 is unique for all outstanding requests.

According to one implementation, local transaction identifier field 1108 is a field generated by a requesting agent, and it is unique for all outstanding requests that require a completion for that requesting agent. Furthermore, in this example, source identifier 1110 uniquely identifies the requestor agent within a PCIe hierarchy. Accordingly, together with source ID 1110, local transaction identifier 1108 field provides global identification of a transaction within a hierarchy domain.

Attributes field 1104 specifies characteristics and relationships of the transaction. In this regard, attributes field 1104 is potentially used to provide additional information that allows modification of the default handling of transactions. In one embodiment, attributes field 1104 includes priority field 1112, reserved field 1114, ordering field 1116, and no-snoop field 1118. Here, priority sub-field 1112 may be modified by an initiator to assign a priority to the transaction. Reserved attribute field 1114 is left reserved for future, or vendor-defined usage. Possible usage models using priority or security attributes may be implemented using the reserved attribute field.

In this example, ordering attribute field 1116 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1118 is utilized to determine if transactions are snooped. As shown, channel ID Field 1106 identifies a channel that a transaction is associated with.

Link Layer

Returning to FIG. 10, Link layer 1010, also referred to as data link layer 1010, acts as an intermediate stage between transaction layer 1005 and the physical layer 1020. In one embodiment, a responsibility of the data link layer 1010 is providing a reliable mechanism for exchanging Transaction Layer Packets (TLPs) between two components a link. One side of the Data Link Layer 1010 accepts TLPs assembled by the Transaction Layer 1005, applies packet sequence identifier 1011, i.e. an identification number or packet number, calculates and applies an error detection code, i.e. CRC 1012, and submits the modified TLPs to the Physical Layer 1020 for transmission across a physical to an external device.

Physical Layer

In one embodiment, physical layer 1020 includes logical sub block 1021 and electrical sub-block 1022 to physically transmit a packet to an external device. Here, logical sub-block 1021 is responsible for the "digital" functions of Physical Layer 1021. In this regard, the logical sub-block includes a transmit section to prepare outgoing information for transmission by physical sub-block 1022, and a receiver section to identify and prepare received information before passing it to the Link Layer 1010.

Physical block 1022 includes a transmitter and a receiver. The transmitter is supplied by logical sub-block 1021 with symbols, which the transmitter serializes and transmits onto to an external device. The receiver is supplied with serialized symbols from an external device and transforms the received signals into a bit-stream. The bit-stream is de-serialized and supplied to logical sub-block 1021. In one embodiment, an 8b/10b transmission code is employed, where ten-bit symbols are transmitted/received. Here, special symbols are used to frame a packet with frames 1023. In addition, in one example, the receiver also provides a symbol clock recovered from the incoming serial stream.

As stated above, although transaction layer 1005, link layer 1010, and physical layer 1020 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 12:
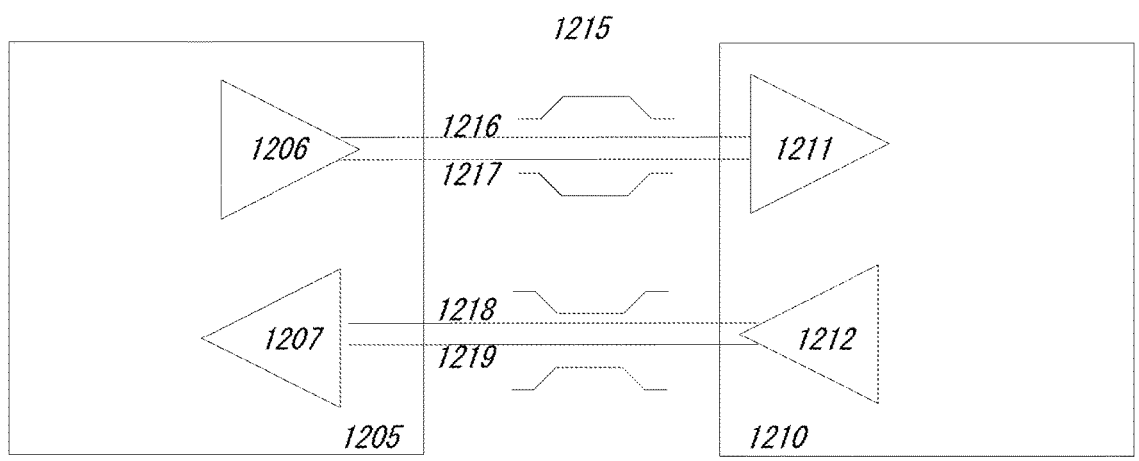
FIG. 12 illustrates an embodiment of a transmitter and receiver pair for an interconnect architecture.

Referring next to FIG. 12, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1206/1211 and a receive pair 1212/1207. Accordingly, device 1205 includes transmission logic 1206 to transmit data to device 1210 and receiving logic 1207 to receive data from device 1210. In other words, two transmitting paths, i.e. paths 1216 and 1217, and two receiving paths, i.e. paths 1218 and 1219, are included in a PCIe link.

A transmission path refers to any path for transmitting data, such as a transmission line, a copper line, an optical line, a wireless communication channel, an infrared communication link, or other communication path. A connection between two devices, such as device 1205 and device 1210, is referred to as a link, such as link 1215. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1216 and 1217, to transmit differential signals. As an example, when line 1216 toggles from a low voltage level to a high voltage level, i.e. a rising edge, line 1217 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 13:
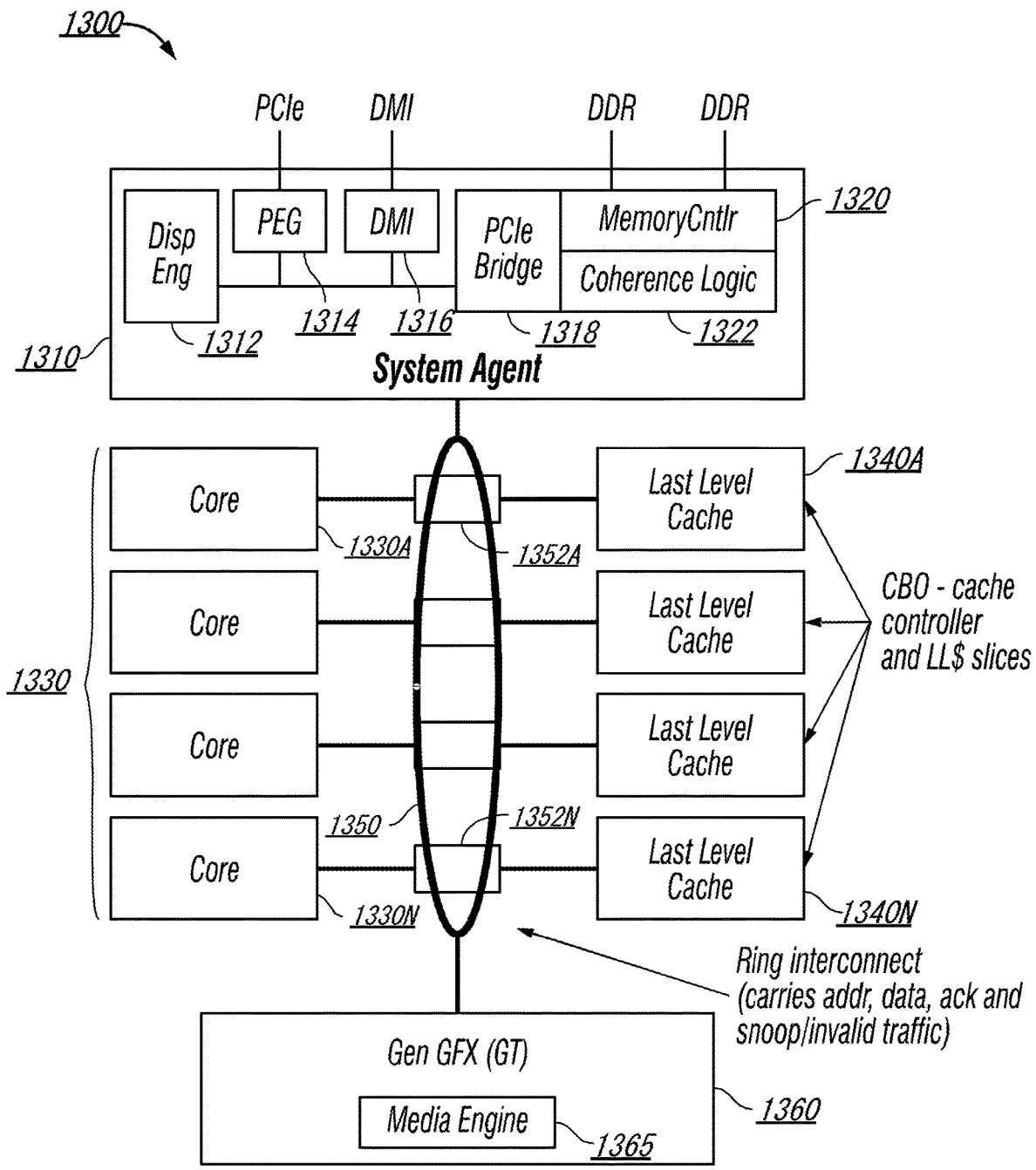
FIG. 13 illustrates an embodiment of a multicore processor.

Referring now to FIG. 13, shown is a block diagram of an embodiment of a multicore processor. As shown in the embodiment of FIG. 13, processor 1300 includes multiple domains. Specifically, a core domain 1330 includes a plurality of cores 1330A-1330N, a graphics domain 1360 includes one or more graphics engines having a media engine 1365, and a system agent domain 1310.

In various embodiments, system agent domain 1310 handles power control events and power management, such that individual units of domains 1330 and 1360 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1330 and 1360 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1330 further includes low level caches in addition to various execution units and additional processing elements. Here, the various cores are coupled to each other and to a shared cache memory that is formed of a plurality of units or slices of a last level cache (LLC) 1340A-1340N; these LLCs often include storage and cache controller functionality and are shared amongst the cores, as well as potentially among the graphics engine too.

As seen, a ring interconnect 1350 couples the cores together, and provides interconnection between the core domain 1330, graphics domain 1360 and system agent circuitry 1310, via a plurality of ring stops 1352A-1352N, each at a coupling between a core and LLC slice. As seen in FIG. 13, interconnect 1350 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1310 includes display engine 1312 which is to provide control of and an interface to an associated display. System agent domain 1310 may include other units, such as: an integrated memory controller 1320 that provides for an interface to a system memory (e.g., a DRAM implemented with multiple DIMMs; coherence logic 1322 to perform memory coherence operations. Multiple interfaces may be present to enable interconnection between the processor and other circuitry. For example, in one embodiment at least one direct media interface (DMI) 1316 interface is provided as well as one or more PCIe™ interfaces 1314. The display engine and these interfaces typically couple to memory via a PCIe™ bridge 1318. Still further, to provide for communications between other agents, such as additional processors or other circuitry, one or more other interfaces (e.g. an Intel® Quick Path Interconnect (QPI) fabric) may be provided.

Figure 14:
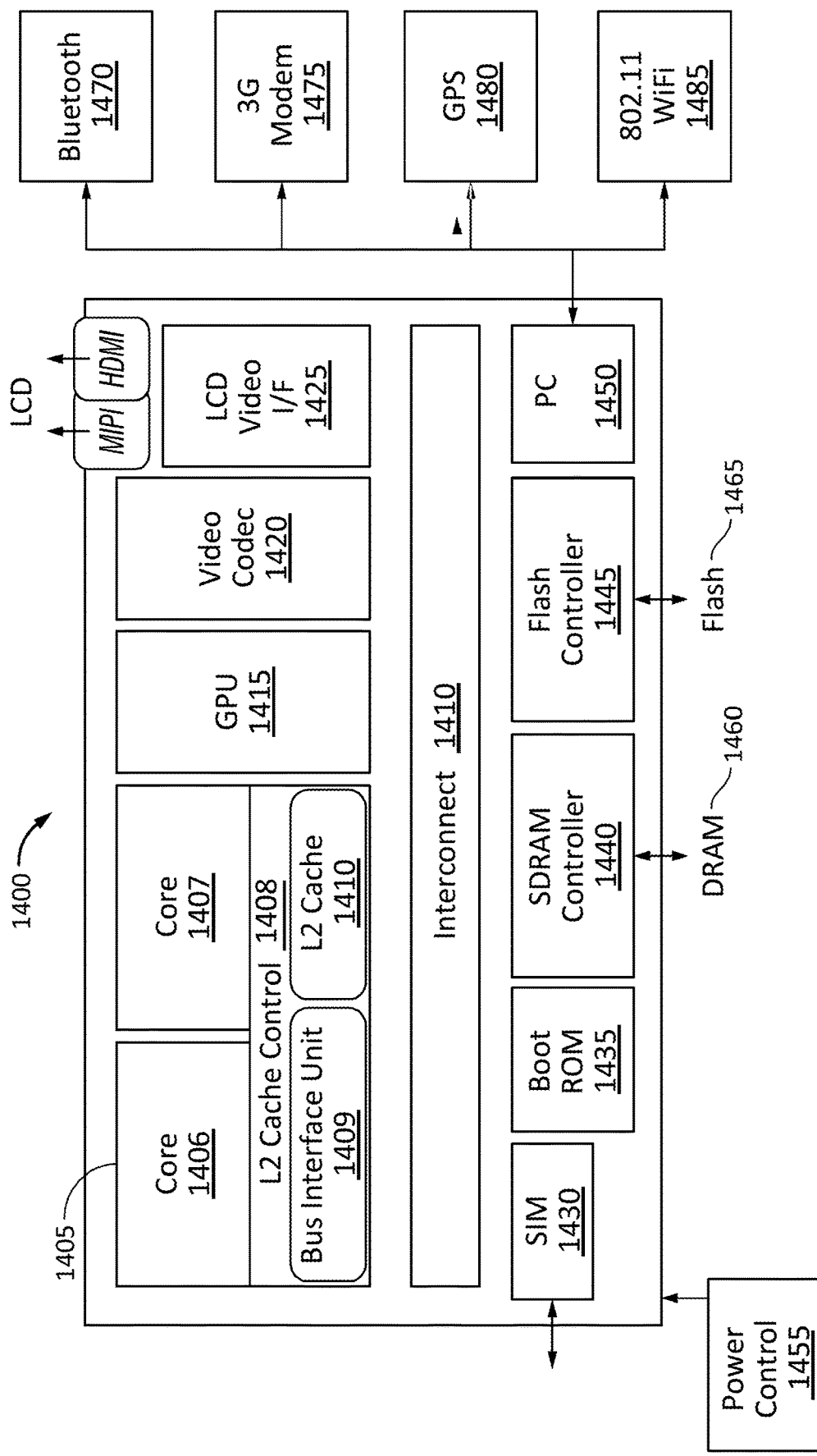
FIG. 14 illustrates another embodiment of a block diagram for a computing system.

Turning next to FIG. 14, an embodiment of a system on-chip (SOC) design in accordance with the inventions is depicted. As a specific illustrative example, SOC 1400 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1400 includes 2 cores-1406 and 1407. Similar to the discussion above, cores 1406 and 1407 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of system 1400. Interconnect 1410 includes an on-chip interconnect, such as an IOSF, AMBA, or other interconnect discussed above, which potentially implements one or more aspects of the described invention.

Interface 1410 provides communication channels to the other components, such as a Subscriber Identity Module (SIM) 1430 to interface with a SIM card, a boot ROM 1435 to hold boot code for execution by cores 1406 and 1407 to initialize and boot SOC 1400, a SDRAM controller 1440 to interface with external memory (e.g. DRAM 1460), a flash controller 1445 to interface with non-volatile memory (e.g. Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces may incorporate aspects of the invention described herein.

In addition, the system illustrates peripherals for communication, such as a Bluetooth module 1470, 3G modem 1475, GPS 1485, and WiFi 1485. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following paragraphs provide examples of various ones of the embodiments disclosed herein.

Example 1 is an input/output controller apparatus that includes an output port to receive a connection to a display device; a multiplexer coupled to the input port; a first input port coupled to the multiplexer; a second input port coupled to the multiplexer; a memory element to store graphics preference data; and ThunderBolt (TBT) firmware (FW). The TBT FW can detect a connected device at the input port; determine a graphics processor for the connected device based on the graphics preference data; and logically connect the connected device to one of the first input port or the second input port through the multiplexer based on the determined graphics processor.

Example 2 may include the subject matter of example 1, wherein the input/output controller includes a ThunderBolt interface controller.

Example 3 may include the subject matter any of examples 1-2, wherein the output port includes a universal serial bus type C port.

Example 4 may include the subject matter any of examples 1-3, wherein the first input port is a first display port, and wherein the second input port is a second display port.

Example 5 may include the subject matter any of examples 1-4, wherein the graphics preference data includes extended display identity data (EDID).

Example 6 may include the subject matter any of examples 1-4, wherein the graphics preference data includes a vendor identifier for the connected device.

Example 7 may include the subject matter any of examples 1-4, wherein the graphics preference data includes an application name.

Example 8 may include the subject matter of example may include the subject matter any of examples 1-7, further including a Peripheral Component Interconnect Express (PCIe) port.

Example 9 may include the subject matter of example 1, wherein the first output port includes an output display port.

Example 10 may include the subject matter of any of examples 1-9, further including controller logic to perform a hotplug detection based on a connection to the output port.

Example 11 is a method for switching between an internal graphics card and an external graphics card, the method including detecting a connected device at an input port of a ThunderBolt input/output (I/O) controller; identifying a graphics processor preference identifier for the connected device; determining the graphics processor preference for the connected device based on the graphics processor preference identifier; and connecting the connected device to one of a first display port or a second display port based on the determined graphics processor preference.

Example 12 may include the subject matter of example 11, wherein the graphics processor preference identifier includes an extended display identity data (EDID).

Example 13 may include the subject matter of example 11, wherein the graphics processor preference identifier includes a name of an application running on the connected device.

Example 14 may include the subject matter of example 11, wherein the graphics processor preference identifier includes a subsystem vendor identifier (SVID).

Example 15 may include the subject matter of any of examples 11-14, wherein the graphics processor preference identifier indicates a preference for a connection to an internal graphics card, and wherein connecting the connected device to one of the first display port of the second display port includes connecting the connected device to a first display port, the first display port connected to the internal graphics processor.

Example 16 may include the subject matter of example 15, wherein connecting the connected device to the first display port includes routing display signals from the connected device to the first display port.

Example 17 may include the subject matter of example 15, further including performing an interrupt service request; determining a maximum link rate for the connected device; and determining a maximum link number for the connected device.

Example 18 may include the subject matter of example 11, wherein identifying a graphics processor preference identifier for the connected device includes obtaining the graphics processor preference identifier through a handshake between the ThunderBolt I/O controller and the connected device; and storing the graphics processor preference identifier in a memory element associated with the ThunderBolt I/O controller.

Example 19 may include the subject matter of any of examples 11-18, wherein determining the graphics processor preference for the connected device based on the graphics processor preference identifier includes comparing the obtained graphics processor preference identifier with one or more stored graphics processor preferences.

Example 20 may include the subject matter of any of examples 11-19, wherein the one or more stored graphics processor preference identifiers includes a whitelist of graphics processor preference identifiers.

Example 21 is a computing system including a graphics processor board connected to the computing system by a link compliant with a Peripheral Component Interconnect Express (PCIe) protocol; a hardware processing device including an internal graphics processor; a ThunderBolt input/output controller subsystem connected to the computing subsystem by a link compliant with the PCIe protocol. The ThunderBolt input/output controller subsystem including an input port; a first display output port logically coupled to the internal graphics processor; a second display output port logically coupled to the graphics processor board; a switch circuit linking the input port to the first display output port and the second display output port; and TBT FW logic. The TBT FW logic to detect a connected device connected to the input port; obtaining a graphics processor preference identifier from the connected device; determining a graphics processor preference based on an identifier received from the connected device; and instructing the switch circuit to logically couple the connected device to one of the internal graphics processor via the first display output port or the graphics processor board via the second display output port based on the determined graphics processor preference.

Example 22 may include the subject matter of example 21, wherein the graphics processor preference identifier includes one of an extended display identity data (EDID), a subsystem vendor identifier (SVID), or an application name.

Example 23 may include the subject matter of any of examples 21-22, wherein the ThunderBolt input/output controller subsystem includes a memory element to store a whitelist of graphics processor preference identifiers, the whitelist correlating a graphics processor preference identifier with a graphics processor preference.

Example 24 may include the subject matter of any of examples 21-23, wherein hardware processing device and the ThunderBolt input/output controller subsystem are connected by a ThunderBolt link, the ThunderBolt link compliant with a Peripheral Component Interconnect Express (PCIe) protocol.

Example 25 may include the subject matter of any of examples 21-24, wherein the TBT FW is to detect a connected device via a hotplug detection, the TBT FW to cause the ThunderBolt input/output subsystem to obtain the graphics processor preference identifier from the connected device, identify the graphics processor preference for the connected device, perform link training with the connected device, and logically couple the connected device to one or the internal graphics processor or the graphics processor board.

Example 26 may include the subject matter of example 21, and can also include a plurality of multiplexers logically coupled to one or more of the display ports, the multiplexers configured to logically route signals from one or more input ports to one of the internal graphics processor or other the external graphics card.

Example 27 may include the subject matter of example 26, wherein the each of the plurality of multiplexers is logically coupled to a retimer.

Example 28 is an input/output controller apparatus that includes an output port to receive a connection to a display device; a first input port; a second input port; a means for switching the output port between the first input port and the second input port; a memory element to store graphics preference data; and a means for controlling the switching of the first output port between the first input port and the second input port. The means for controlling can include means for detecting a connected device at the input port; determining a graphics processor for the connected device based on the graphics preference data; and logically connecting the connected device to one of the first input port or the second input port through the multiplexer based on the determined graphics processor.

Example 29 is a computer program product tangibly embodied on non-transitory computer-readable media, the computer program product comprising code that when executed cause a controller to detect a connected device at an input port of a ThunderBolt input/output (I/O) controller; identify a graphics processor preference identifier for the connected device; determine a graphics processor preference for the connected device based on the graphics processor preference identifier; and connect the connected device to one of a first display port or a second display port based on the determined graphics processor preference.

Example 30 may include the subject matter of example 29, wherein the graphics processor preference identifier comprises an extended display identity data (EDID).

Example 31 may include the subject matter of example 29, wherein the graphics processor preference identifier comprises a name of an application running on the connected device.

Example 32 may include the subject matter of example 11, wherein the graphics processor preference identifier comprises a subsystem vendor identifier (SVID).

Example 33 may include the subject matter of any of examples 29-32, wherein the graphics processor preference identifier is used to identify a preference for a connection to an external graphics card, and wherein connecting the connected device to one of the first display port of the second display port comprises logically connecting the connected device to a first display port, the first display port connected to the external graphics card.

Example 34 may include the subject matter of example 33, wherein connecting the connected device to the first display port comprises routing display signals from the connected device to the first display port.

Example 35 may include the subject matter of example 33, further including performing an interrupt service request; determining a maximum link rate for the connected device; and determining a maximum link number for the connected device.

Example 36 may include the subject matter of any of examples 29-35, wherein identifying a graphics processor preference identifier for the connected device comprises obtaining the graphics processor preference identifier through a handshake between the ThunderBolt I/O controller apparatus and the connected device; and storing the graphics processor preference identifier in a memory element associated with the ThunderBolt I/O controller.

Example 37 may include the subject matter of any of examples 29-36, wherein determining the graphics processor preference for the connected device based on the graphics processor preference identifier includes using the obtained graphics processor preference identifier to lookup one or more stored graphics processor preferences and a corresponding graphics processor preference; and determining an address for the determined graphics processor preference.

Example 38 may include the subject matter of any of examples 29-37, wherein the one or more stored graphics processor preference identifiers comprises a whitelist of graphics processor preference identifiers.

What is claimed is:

1. An input/output (I/O) controller apparatus comprising:
   an output port to receive a connection to a display device;
   a multiplexer coupled to the output port;
   a first input port coupled to the multiplexer, wherein the first input port is to couple to a first graphics processor device;
   a second input port coupled to the multiplexer, wherein the second input port is to couple to another second graphics processor device;
   a memory element to store graphics preference data; and
   ThunderBolt (TBT) firmware (FW) to:
     detect a connected device at the output port;
     determine one of the first graphics processor device or the second graphics processor device to be used for the connected device based on the graphics preference data; and
     logically connect the connected device to one of the first input port or the second input port through the multiplexer based on the determined one of the first graphics processor device or the second graphics processor device.

2. The input/output controller apparatus of claim 1, wherein the I/O controller apparatus comprises a ThunderBolt interface controller.

3. The input/output controller apparatus of claim 1, wherein the output port comprises a universal serial bus type C port.

4. The input/output controller apparatus of claim 1, wherein the first input port is a first display port, and wherein the second input port is a second display port.

5. The input/output controller apparatus of claim 1, wherein the graphics preference data comprises extended display identity data (EDID).

6. The input/output controller apparatus of claim 1, wherein the graphics preference data comprises a vendor identifier for the connected device.

7. The input/output controller apparatus of claim 1, wherein the graphics preference data comprises an application name.

8. The input/output controller apparatus of claim 1, further comprising a Peripheral Component Interconnect Express (PCIe) port.

9. The input/output controller apparatus of claim 1, wherein the first input port comprises an output display port.

10. The input/output controller apparatus of claim 1, further comprising controller logic to perform a hotplug detection based on a connection to the output port.

11. A method for switching between an internal graphics card and an external graphics card, the method comprising:
    detecting a connected device at an input port of a ThunderBolt input/output (I/O) controller;
    identifying a graphics processor preference identifier for the connected device;
    determining, using firmware of the ThunderBolt I/O controller, a graphics processor preference for the connected device based on the graphics processor preference identifier and graphics preference data stored locally within the ThunderBolt I/O controller; and
    connecting the connected device to one of a first display port of the ThunderBolt I/O controller or a second display port of the ThunderBolt I/O controller based on the determined graphics processor preference.

12. The method of claim 11, wherein the graphics processor preference identifier comprises an extended display identity data (EDID).

13. The method of claim 11, wherein the graphics processor preference identifier comprises a name of an application running on the connected device.

14. The method of claim 11, wherein the graphics processor preference identifier comprises a subsystem vendor identifier (SVID).

15. The method of claim 11, wherein the graphics processor preference identifier is used to identify a preference for a connection to an external graphics card, and wherein connecting the connected device to one of the first display port of the second display port comprises logically connecting the connected device to a first display port, the first display port connected to the external graphics card.

16. The method of claim 15, wherein connecting the connected device to the first display port comprises routing display signals from the connected device to the first display port.

17. The method of claim 15, further comprising:
performing an interrupt service request;
determining a maximum link rate for the connected device; and
determining a maximum link number for the connected device.

18. The method of claim 11, wherein identifying a graphics processor preference identifier for the connected device comprises obtaining the graphics processor preference identifier through a handshake between the ThunderBolt I/O controller apparatus and the connected device; and storing the graphics processor preference identifier in a memory element associated with the ThunderBolt I/O controller.

19. The method of claim 11, wherein determining the graphics processor preference for the connected device based on the graphics processor preference identifier comprises:
using the obtained graphics processor preference identifier to lookup one or more stored graphics processor preferences and a corresponding graphics processor preference in the graphics preference data; and
determining an address for the determined graphics processor preference.

20. The method of claim 11, wherein the one or more stored graphics processor preference identifiers comprises a whitelist of graphics processor preference identifiers.

21. A computing system comprising:
a processor core comprising an internal graphics processor;
a graphics board connected to the processor core by a link compliant with a Peripheral Component Interconnect Express (PCIe)-based protocol;
a ThunderBolt input/output controller subsystem connected to the processor core by a link compliant with the PCIe-based protocol, the ThunderBolt input/output controller subsystem comprising:
an output port;
at least one display port;
a switch circuit linking the output port to the display port;
local memory to store graphics preference data; and
firmware logic to:
detect a connected device connected to the output port;
obtaining a graphics processor preference identifier from the connected device;
determine a graphics processor preference for the connected device using the graphics processor preference identifier and the graphics preference data; and
instructing the switch circuit to logically couple the connected device to one of the internal graphics processor or the graphics board via the display port based on the determined graphics processor preference.

22. The computing system of claim 21, wherein the graphics processor preference identifier comprises one of an extended display identity data (EDID), a subsystem vendor identifier (SVID), or an application name.

23. The computing system of claim 21, wherein the graphics preference data comprises a mapping of graphics processor preference identifiers, wherein the mapping correlates a graphics processor preference identifier with a graphics processor preference.

24. The computing system of claim 21, wherein hardware processing device and the ThunderBolt input/output controller subsystem are connected by a ThunderBolt link, the ThunderBolt link compliant with a Peripheral Component Interconnect Express (PCIe) protocol.

25. The computing system of claim 21, wherein the computing system comprises a ThunderBolt firmware (FW) implemented at least partially in hardware, the TBT FW logic is to detect a connected device via a hotplug detection, the TBT FW to cause the ThunderBolt input/output controller subsystem to obtain the graphics processor preference identifier from the connected device, identify a graphics processor preference for the connected device, perform link training with the connected device, and logically couple the connected device to one or the internal graphics processor or the graphics board.

* * * * *